United States Patent [19]

Kimura et al.

[11] Patent Number: 4,593,984
[45] Date of Patent: Jun. 10, 1986

[54] VIEWFINDER LENS SYSTEM

[75] Inventors: Kazuo Kimura, Sakai; Hiromu Mukai, Kawachinagano; Taro Shibuya, Sakai, all of Japan

[73] Assignee: Minolta Camera Kabushiki Kaisha, Osaka, Japan

[21] Appl. No.: 711,084

[22] Filed: Mar. 12, 1985

[30] Foreign Application Priority Data

Mar. 12, 1984 [JP] Japan .................................. 59-47737

[51] Int. Cl.$^4$ .......................... G03B 13/02; G02B 3/02
[52] U.S. Cl. .................................... 354/219; 350/410; 350/432
[58] Field of Search ............... 354/155, 219, 224, 225; 350/410, 432–435, 474, 453, 479

[56] References Cited

U.S. PATENT DOCUMENTS

| 4,217,048 | 8/1980 | Egawa | 354/155 |
| 4,265,529 | 5/1981 | Yokota | 354/224 |
| 4,389,097 | 6/1983 | Ohishi | 350/410 |
| 4,437,750 | 3/1984 | Ikari | 354/155 |

FOREIGN PATENT DOCUMENTS 53-135657  11/1978  Japan .

*Primary Examiner*—William B. Perkey
*Attorney, Agent, or Firm*—Price, Gess & Ubell

[57] ABSTRACT

An improved eyepiece for a viewfinder of a single lens reflex camera is provided. This improved eyepiece includes a negative first lens element and a positive second lens element with an air space formed between the first and second lens elements. The second lens element has an aspheric surface at its object side. The configuration of the aspheric surface is a hyperboloid of revolution.

14 Claims, 25 Drawing Figures

VIEWFINDER LENS SYSTEM

BACKGROUND OF THE INVENTION

1. Field of the Invention

The present invention relates to an eyepiece, and more particularly to a viewfinder lens system for use in a single lens reflex camera.

2. Description of the Prior Art

As a viewfinder lens system for use in a single lens reflex camera, a doublet type lens system which consists of two glass lens elements cemented to each other is known. However, such a construction requires a cementing step for cementing two lens elements to each other in its manufacturing procedure. Thus, it causes the increase of the cost of the production, the undesirable mixture of dust and bubbles in the cementing layer, the error of centration of two lens elements cemented to each other and, the undesirable coloring of the lens system due to the coloring of the cementing layer. Furthermore, such cementing may cause and increase of reflectance at the cemented surface, since a cementing material having a suitable refractive index for reducing the reflectance at the cemented surface does not exist.

A viewfinder lens system of a separate type which consists of two lens element with an air space therebetween is proposed. For example, in Japanese Laid-Open Patent Application (Tokkaisho) No. 53-135657 and U.S. Pat. No. 4,265,529, a viewfinder lens system, consisting from the object side, a positive first lens element and a negative second lens element with an air space formed therebetween, is disclosed. In this lens system, since the surface configuration of each of the elements is almost unchanged from the doublet type lens system, the radius of curvature of the eye side surface of the first lens element is almost equal to that of the object side surface of the second lens element. However, although the error of centration and the deviation of the thickness of the cemented layer from the designed thickness scarcely influences aberrations of the whole lens system in the doublet type lens system, in the separate type lens system, the deviation of the actual distance of two lens elements from the designed distance and the slight displacement of each lens elements will cause to be introduce a great change in aberrations.

In U.S. Pat. Nos. 4,217,048 and 4,437,750, another separate type viewfinder lens system which consists of, from the object side, a nagative first lens element and a positive second lens element with an air space formed therebetween is disclosed. However, in a lens system, since the radius of curvature of the eye side surface of the first lens element is almost equal to that of the object side surface of the second lens element and since such a radius of curvature is extremely small, any error in mounting would cause a great amount of aberration.

SUMMARY OF THE INVENTION

An object of the present invention is to provide a viewfinder lens system of a separate type in which the influence of the deviation of the actual distance between two lens element from the designed distance on the aberrations and the influence of the displacement of each lens elements thereon are reduced in comparison with the conventional separate type viewfinder lens system, and in which the aberrations are well corrected.

According to the present invention, a viewfinder lens system comprising from the object side to the eye side, a first lens element having a negative refractive power, a second lens element having a positive refractive power with an air space formed between the first and second lens elements, wherein the second lens element has an aspheric surface at its object side, whose radius of curvature increases in accordance with the increase of the height from the optical axis; and the viewfinder lens system fulfills the following conditions:

$0.4 < R_2/f < 1.2$ $0.35 < R_3/R_2 < 0.8$ $-1.5 < R_4/f < -0.5$ $-0.8 < \epsilon < 0$ $25 < \nu_1 < 35$ $\{ < \nu_2 < 65$ wherein:
- $R_2$ represents the radius of curvature of the eye side surface in the first lens element;
- $R_3$ represents the paraxial radius of curvature of the object side surface in the second lens element;
- $R_4$ represents the radius of curvature of the eye side surface in the second lens element;
- f represents the focal length of the whole lens system;
- $\nu_1$ represents the Abbe number of the first lens element;
- $\nu_2$ represents the Abbe number of the second lens element; and
- $\epsilon$ represents the aspheric coefficient of the aspheric surface provided by $$X = (R_3 - \sqrt{R_3^2 \epsilon Y^2})/\epsilon$$

wherein, X represents the distance, measured along a direction parallel with the optical axis, from the center of the aspheric surface to a point on the aspheric surface at the height, Y, from the optical axis.

The features of the present invention which are believed to be novel are set forth with particularly in the appended claims. The present invention, both as to its organization and manner of operation, together with further objects and advantages thereof, may best be understood by reference to the following description, taken in conjunction with the accompanying drawings.

DETAILED DESCRIPTION OF THE PREFERRED EMBODIMENTS

Figure 1:
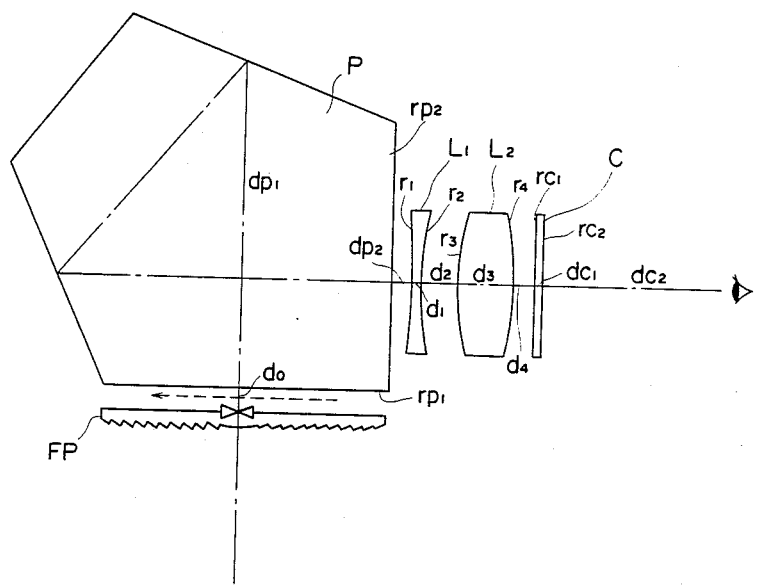
FIG. 1 represents a cross sectional view of the viewfinder lens system and the periphery thereof according to the first to sixth embodiments of the present invention.
Figure 2A:
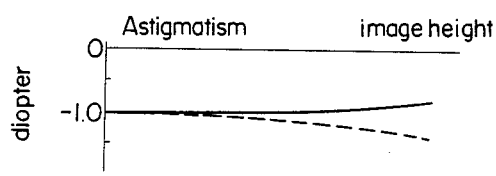
FIGS. 2a to 2d represent the aberration curves of the first embodiment.
Figure 2B:
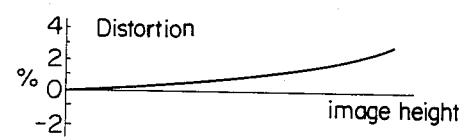
Figure 2C:
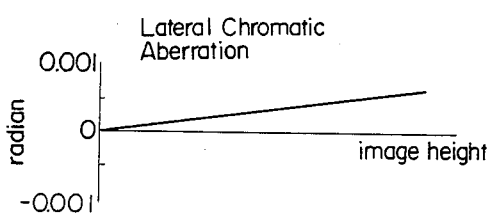
Figure 2D:
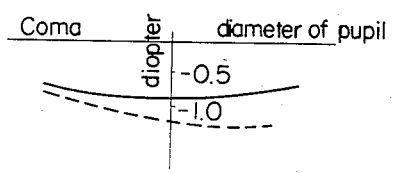
Figure 3A:
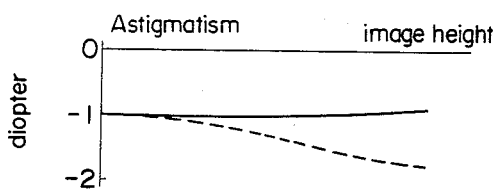
FIGS. 3a to 3d the aberration curves of the second embodiment.
Figure 3B:
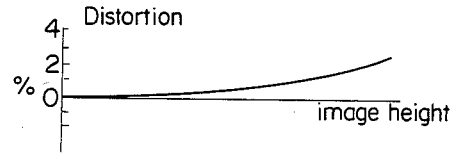
Figure 3C:
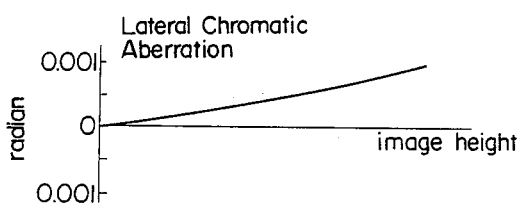
Figure 3D:
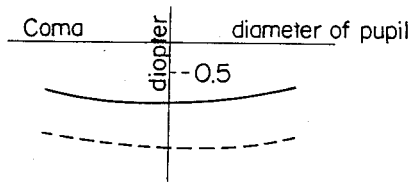
Figure 4A:
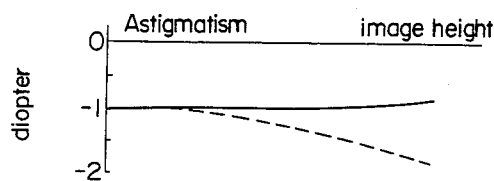
FIGS. 4a to 4d represent the aberration curves of the third embodiment.
Figure 4B:
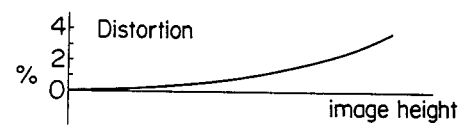
Figure 4C:
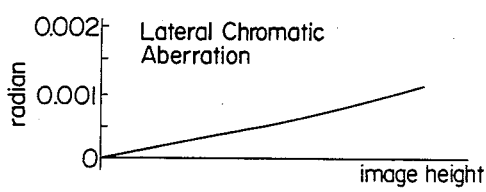
Figure 4D:
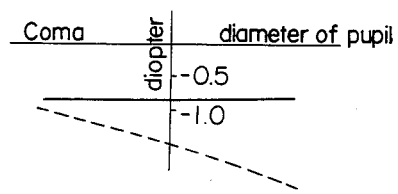
Figure 5A:
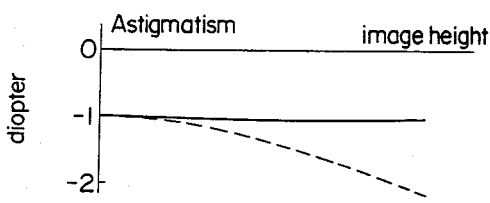
FIGS. 5a to 5d represent the aberration curves of the fourth embodiment.
Figure 5B:
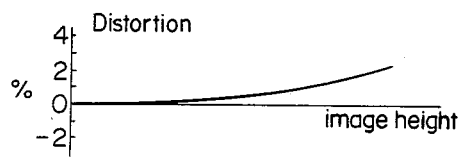
Figure 5C:
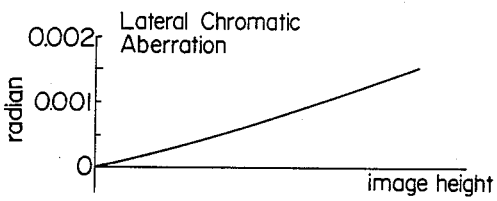
Figure 5D:
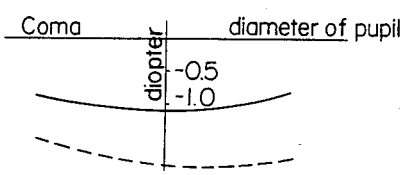
Figure 6A:
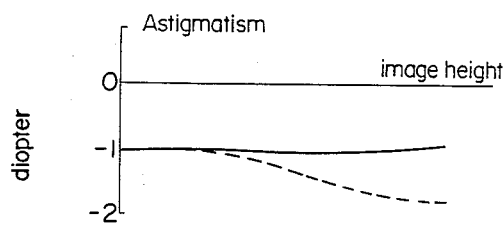
FIGS. 6a to 6d represent the aberration curves of the fifth embodiment.
Figure 6B:
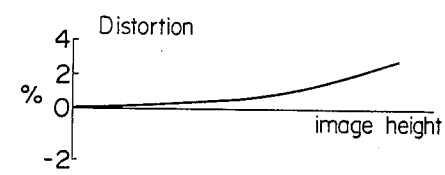
Figure 6C:
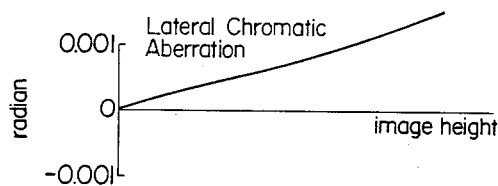
Figure 6D:
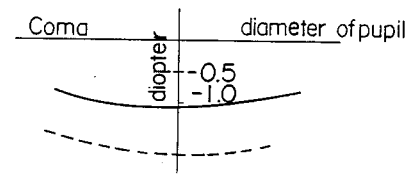
Figure 7A:
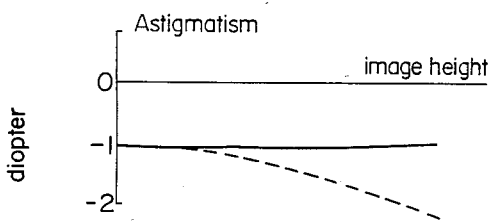
FIGS. 7a to 7d represent the aberration curves of the sixth embodiment.
Figure 7B:
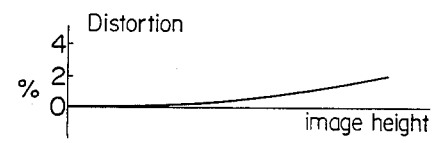
Figure 7C:
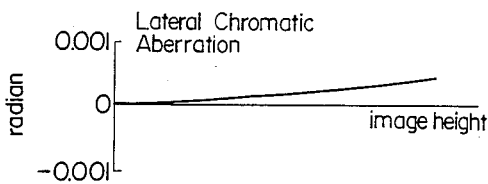
Figure 7D:
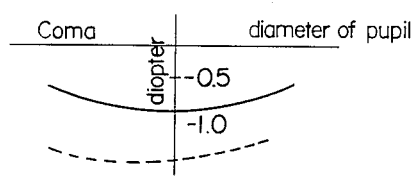

The following description is provided to enable any person skilled in the optical and camera field to make and use the invention and sets forth the best modes contemplated by the inventor for carrying our his invention. Various modifications, however, will remain readily apparent to those skilled in the art, since the generic principles of the present invention have been defined herein specifically to provide a relatively economical and easily manufactured viewfinder lens system. The derivation of the formulas and the relation of the powers set forth herein can be accomplished with the assistance of a computer. The present invention represents the parameters of a compromise balance of acceptable aberrations which can be relatively easily manufactured to provide a low cost viewfinder lens system for utilization with a 35 mm SLR camera.

In the drawings, the schematic cross sectional view discloses the position of the lens elements and includes the individual designation of the radii of curvature and axial distances for each lens element and air space. These values, however, are also provided in the accompanying tables set forth herein. The schematic cross sectional view of the embodiment of FIG. 1 follows the normal conventions of an object at the left-hand side of the drawing and the eye at the right-hand side.

As shown in FIG. 1, the present invention provides a viewfinder lens system comprising from the object side to the eye side, a first lens element ($L_1$) having a negative refractive power, a second lens element ($L_2$) having a positive refractive power with an air space formed between the first and second lens elements, wherein the second lens element ($L_2$) has an aspheric surface at its object side ($r_3$), whose radius of curvature increases in accordance with the increase of the height from the optical axis, and the viewfinder lens system fulfills the following conditions:

$$0.4 < R_2/f < 1.2 \quad (1)$$

$$0.35 < R_3/R_2 < 0.8 \quad (2)$$

$$-1.5 < R_4/f < -0.5 \quad (3)$$

$$-0.8 < \epsilon < 0 \quad (4)$$

$$25 < \nu_1 < 35 \quad (5)$$

$$55 < \nu_2 < 65 \quad (6)$$

wherein:
  $R_2$ represents the radius of curvature of the eye side surface ($r_2$) in the first lens element;
  $R_3$ represents the paraxial radius of curvature of the object side surface ($r_3$) in the second lens element;
  $R_4$ represents the radius of curvature of the eye side surface ($r_4$) in the second lens element;
  f represents the focal length of the whole lens system;
  $\nu_1$ represents the Abbe number of the first lens element ($L_1$);
  $\nu_2$ represents the Abbe number of the second lens element ($L_2$); and
  $\epsilon$ represents the aspheric coefficient of the aspheric surface provided by $$X = (R_3 - \sqrt{R_3^2 - \epsilon Y^2})/\epsilon$$

wherein, X represents the distance, measured along a direction parallel with the optical axis, from the center of the aspheric surface to a point on the aspheric surface ($r_3$) at the height, Y, from the optical axis.

In the conventional viewfinder lens systems as disclosed in U.S. Pat. Nos. 4,217,048 and 4,437,750, the positive aberrations of the positive second lens element are almost generated at its object side surface, and cancelled well by the eye side surface of the negative first lens element. Thus, both of the radi of curvature of the object side surface of the second lens element and that of the eye side surface of the first lens element are designed to be relatively small.

On the other hand, according to the present invention, the positive aberration of the second lens element ($L_2$) is reduced by introducing an aspheric surface, whose radius of curvature increases in accordance with and increase of the height from the optical axis, to its object side surface. Therefore, good correction of the aberrations can be achieved even if the negative aberration generated in the first lens element ($L_1$) for cancelling the positive aberrations of the second lens element ($L_2$) is reduced. Thus, if some displacement between the first and second lens element ($L_1$)($L_2$) occurs, the changes of the aberrations are insignificant. Furthermore, the permissible range of the deviation of the distance between the first and second lens element ($L_1$)($L_2$) from the design distance can be extended.

Condition (1) limits the radius of curvature of the eye side surface ($r_2$) of the first lens element ($L_1$). If the lower limit of the condition (1) is violated, the changes of the aberrations due to the displacement is undesirably increased, since the refractive power of this surface ($r_2$) becomes too strong. If the upper limit of the condition (1) is violated, the astigmatism and the distortion are greatly increased.

Condition (2) limits the ratio of the paraxial radius of the curvature of the object side surface ($r_3$) of the second lens element ($L_2$) to the radius of curvature of the eye side surface ($r_2$) of the first lens element ($L_1$). It defines that the paraxial radius of curvature of the surface ($r_3$) to which an aspheric surface is introduced is almost half of the radius of curvature of the eye side surface ($r_2$) of the first lens element ($L_1$). If the lower or upper limit of the condition (2) is violated, it becomes difficult to maintain a good correction condition for the aberrations, since the aberrations generated respectively in the surfaces ($r_2$) and ($r_3$) can not be cancelled with each other.

Condition (3) limits the radius of curvature of the eye side surface ($r_4$) of the second lens element ($L_2$). If the lower limit of the condition (3) is violated, the astigmatism is deteriorated undesirably. On the other hand, if the upper limit of the condition (3) is violated, the distortion is increased unfavorably.

Condition (4) defines that the aspheric surface configuration applied to the object side surface ($r_3$) of the second lens element ($L_2$) a hyperboloid of revolution, and limits the aspheric coefficient of the aspheric surface. The negative aspheric coefficient means that the aspheric surface configuration is the hyperboloid of revolution. If the lower limit of the condition (4) is violated, negative astigmatism is undesirably generated. If the upper limit of the condition (4) is violated, the positive aberrations are unfavorably generated, and especially, positive astigmatism is increased, since the surface configuration becomes spheric.

Here, if the aspheric surface configuration is represented as the deviation from the spheric surface by the following equation, $$X = R_3 - \sqrt{R_3 - Y^2} + \sum_{i=1}^{\infty} C_i Y^{2i}$$

the coefficients Ci are represented as follows:

$$C_2 = \frac{1}{8}\left(\frac{1}{R_3}\right)^3 (\epsilon - 1)$$

$$C_3 = \frac{1}{16}\left(\frac{1}{R_3}\right)^5 (\epsilon^2 - 1)$$

$$C_4 = \frac{5}{128}\left(\frac{1}{R_3}\right)^7 (\epsilon^3 - 1)$$

Conditions (5) and (6) limit the Abbe numbers of the first and second lens elements ($L_1$) and ($L_2$), respectively. If the lower limit of the condition (5) or the upper limit of the condition (6) is violated, since the difference in Abbe number between the first and second lens element ($L_1$)($L_2$) becomes large, the chromatic aberration becomes over-corrected condition. Contrary, if the upper limit of the condition (5) or the lower limit of condition (6) is violated, since the difference in Abbe number between the first and second lens element ($L_1$)($L_2$) becomes too small, the chromatic aberration becomes under-corrected.

In FIG. 1, (P) represents a pentagonal roof prism, (FP) represents a focal plate, and (C) represents a cover plate used in the fourth to sixth embodiments. In the pentagonal roof prism (P), a surface faced to the focal plate (FP) is represented by rp1, and a surface faced to the eyepiece lens system is represented by rp2. Furthermore, in the cover plate (C), the object and eye side surfaces are represented by rC1 and rC2, respectively. The air space between the focal plate (FP) and the pentagonal roof prism (P) is represented by do, the optical distance from the surface (rp1) to the surface (rp2) is represented by dp1, the air space between the pentagonal roof prism (P) and the first lens element ($L_1$) is represented by dp2, the axial thickness of the cover plate (C) is represented by dC1, and the air space between the cover plate (C) and the eye-point is represented by dC2.

The following Tables 1 to 6 disclose, respectively, the first through sixth embodiments of the present invention. In the Tables, f equals the focal length, r is the radius of curvature with respective sub numbers indicating the surfaces from the object to image side along the optical axis, d represents the axial distance and includes both the air spaces and the actual thickness of the lenses along the optical axis, nd equals the refractive index and again, the sub numbers refer to the particular optical element from the object to image side, and finally ν equals the Abbe number and the sub numbers refer to the specific lens elements from the object to image side. The subscripts p and c indicate that such amount relates to the pentagonal roof prism (P) and the cover plate (C), respectively. The asterisk (*) represents the aspheric surface, and its coefficients are shown at the bottom of respective Tables.

In the following embodiments, the first embodiment shows a construction in which both of the first and second lens elements ($L_1$)($L_2$) are made of glass material respectively, with the first lens element ($L_1$) being shifted along the optical axis for a diopter adjustment. In the second embodiment, both of a the first and second lens elements ($L_1$)($L_2$) are made of synthetic resin material, respectively. The third embodiment is a modification of the second embodiment by applying a negative menicus lens element to the first lens element ($L_1$). In the fourth embodiment, both of the first and second lens elements ($L_1$)($L_2$) are made of a synthetic resin material, the second lens element ($L_2$) being shifted along the optical axis for a diopter ajdustment. Furthermore, the cover plate (C) is located on the eye side of the second lens element ($L_2$) for protecting against dust in the fourth embodiment. In the fifth embodiment, the cover plate (C) has a slight negative refractive power for increasing the magnification. Furthermore, in the sixth embodiment, the cover plate (C) has a slight positive refractive power for further correcting the aberrations. Additionally, the first lens element ($L_1$) of the sixth embodiment is made of a dense flint glass material for further correcting the chromatic aberration, while the second lens element ($L_2$) is made of a synthetic resin material. The second lens element ($L_2$) is shifted along the optical axis for a diopter adjustment. If each of the lens elements is made of synthetic resin material, the cost of the whole viewfinder lens system can be decreased, and the total weight thereof is reduced.

In order to indicate the effect of the present invention, the changing amounts of the astigmatism due to the lateral displacement and the tilt of the lens elements are calculated and are shown in Table 7, with respect to the conventional type lens systems and to the fourth embodiment of the present invention. In the Table 7, both of the lateral displacement and the tilt are considered. DS represents the changing amount of the astigmatism on the sagittal image plane, and DT represents that on the meridional image plane.

The conventional embodiment A indicates the embodiment 1 of U.S. Pat. No. 4,217,048;

The conventional embodiment B indicates the embodiment 8 U.S. Pat. No. 4,265,529;

The conventional embodiment C indicates the embodiment 11 of Japanese Laid-Open Patent Application (Tokkaisho) No. 53-135657; and The conventional embodiment D indicates the embodiment of Japanese Laid-Open Patent Application (Tokkaisho) No. 53-135657.

According to Table 7, it is clear that the changing amount of the astigmatism due to the lateral displacement in the fourth embodiment of the present invention is the smallest among the compared embodiments, and that the changing amount of the astigmatism due to the tilt in the fourth embodiment of the present invention is also relatively small. Thus, the error of the astigmatism due to such displacements in the fourth embodiment of the present invention is very small. Here, the above consideration and calculation are given with respect only to the astigmatism, because it is the most serious problem to change the amount of the astigmatism in accordance with some errors.

TABLE 1

Embodiment 1

| | radius of curvature (mm) | | axial distance (mm) | | refractive index (nd) | Abbe number (νD) |
|---|---|---|---|---|---|---|
| | | | d0 | 0.0 | | |
| P | rp1 | ∞ | dp1 | 77.6909 | ndp 1.5168 | νp 64.12 |
| | rp2 | ∞ | | | | |
| | | | dp2 | 3.3 | | |
| $L_1$ | r1 | −138.227 | d1 | 1 | nd1 1.71736 | ν1 29.42 |
| | r2 | 67.502 | | | | |
| | | | d2 | 3.4 | | |
| $L_2$ | r3* | 28.996 | d3 | 3.8 | nd2 1.58913 | ν2 61.11 |
| | r4 | −71.445 | | | | |
| | | | d4 | 17.0 | | | aspheric coefficient ε = −0.6, f = 70.279 mm
r2/f = 0.960
r3/r2 = 0.430
r4/f = −1.017
diopter adjustment

| dp2 (mm) | d2 (mm) | diopter |
|---|---|---|
| 0.4 | 6.3 | 0.66 |
| 6.3 | 0.4 | −2.85 |
| 3.3 | 3.4 | −1.00 |

TABLE 2

Embodiment 2

| | radius of curvature (mm) | | axial distance (mm) | | refractive index (nd) | Abbe number (νD) |
|---|---|---|---|---|---|---|
| | | | d0 | 0.0 | | |
| P | rp1 | ∞ | dp1 | 77.6909 | ndp 1.5168 | νp 64.12 |
| | rp2 | ∞ | | | | |
| | | | dp2 | 1.2 | | |
| $L_1$ | r1 | −138.227 | d1 | 1.5 | nd1 1.5904 | ν1 30.90 |
| | r2 | 37.875 | | | | |
| | | | d2 | 0.5 | | |
| $L_2$ | r3* | 20.000 | d3 | 6.0 | nd2 1.4914 | ν2 57.90 |
| | r4 | −45.400 | | | | |
| | | | d4 | 18.0 | | | aspheric coefficient ε = −0.5  f = 63.494 mm
r2/f = 0.597
r3/r2 = 0.528
r4/f = −0.715

TABLE 3

Embodiment 3

| | radius of curvature (mm) | | axial distance (mm) | | refractive index (nd) | Abbe number (νd) |
|---|---|---|---|---|---|---|
| | | | d0 | 0.0 | | |
| P | rp1 | ∞ | dp1 | 77.6909 | ndp 1.5168 | νp 64.12 |
| | rp2 | ∞ | | | | |
| | | | dp2 | 1.2 | | |
| $L_1$ | r1 | 210.000 | d1 | 1.5 | nd1 1.5904 | ν1 30.90 |
| | r2 | 26.324 | | | | |
| | | | d2 | 0.5 | | |
| $L_2$ | r3* | 20.000 | d3 | 6.0 | nd2 1.4914 | ν2 57.90 |
| | r4 | −45.400 | | | | |
| | | | d4 | 18.0 | | | aspheric coefficient ε = −0.1  f = 63.040 mm
r2/f = 0.418
r3/r2 = 0.760

TABLE 3-continued

Embodiment 3 r4/f = −0.720

TABLE 4

Embodiment 4

| | radius of curvature (mm) | | axial distance (mm) | | refractive index (nd) | Abbe number (νd) |
|---|---|---|---|---|---|---|
| | | | d0 | 0.0 | | |
| P | rp1 | ∞ | dp1 | 77.6909 | ndp 1.6335 | νp 51.93 |
| | rp2 | ∞ | | | | |
| | | | dp2 | 1.7 | | |
| $L_1$ | r1 | −140.000 | d1 | 1.0 | nd1 1.5904 | ν1 30.90 |
| | r2 | 37.693 | | | | |
| | | | d2 | 2.6 | | |
| $L_2$ | r3* | 21.000 | d3 | 4.5 | nd2 1.4914 | ν2 57.90 |
| | r4 | −46.611 | | | | |
| | | | d4 | 2.2 | | |
| c | rc1 | ∞ | dc1 | 0.8 | ndc 1.4914 | νc 57.90 |
| | rc2 | ∞ | | | | |
| | | | dc2 | 18.0 | | | aspheric coefficient ε = −0.6  f = 63.623 mm
r2/f = 0.592
r3/r2 = 0.557
r4/f = −0.733
diopter adjustment

| d2 (mm) | d4 (mm) | diopter |
|---|---|---|
| 0.4 | 4.4 | −3.48 |
| 4.4 | 0.4 | 0.98 |
| 2.6 | 2.2 | −1.00 |

TABLE 5

Embodiment 5

| | radius of curvature (mm) | | axial distance (mm) | | refractive index (nd) | Abbe number (νd) |
|---|---|---|---|---|---|---|
| | | | d0 | 0.0 | | |
| P | rp1 | ∞ | dp1 | 77.6909 | ndp 1.6335 | νp 51.93 |
| | rp2 | ∞ | | | | |
| | | | dp2 | 1.7 | | |
| L | r1 | −138.227 | d1 | 1.0 | nd1 1.64769 | ν1 33.88 |
| | r2 | 42.111 | | | | |
| | | | d2 | 2.6 | | |
| L | r3* | 21.700 | d3 | 4.5 | nd2 1.5168 | ν2 64.12 |
| | r4 | −44.073 | | | | |
| | | | d4 | 2.2 | | |
| c | rc1 | 250 | dc1 | 0.8 | ndc 1.5168 | νc 64.12 |
| | rc2 | 147.9 | | | | |
| | | | dc2 | 18.0 | | | aspheric coefficient ε = −0.6  f = 63.205 mm
r2/f = 0.666
r3/r2 = 0.515
r4/f = −0.697

TABLE 6

Embodiment 6

| | radius of curvature (mm) | | axial distance (mm) | | refractive index (nd) | Abbe number (νd) |
|---|---|---|---|---|---|---|
| | | | d0 | 0.0 | | |
| P | rp1 | ∞ | dp1 | 77.6909 | ndp 1.6335 | νp 51.93 |
| | rp2 | ∞ | | | | |

TABLE 6-continued

Embodiment 6

| | | | dp2 | 1.5 | | |
|---|---|---|---|---|---|---|
| L$_1$ | r1 | −230.000 | d1 | 1.0 | nd1 1.733 | ν1 28.24 |
| | r2 | 39.280 | d2 | 2.4 | | |
| L$_2$ | r3* | 22.000 | d3 | 5.0 | nd2 1.4914 | ν2 57.90 |
| | r4 | −60.485 | d4 | 2.0 | | |
| c | rc1 | 800 | dc1 | 1.0 | ndc 1.4914 | νc 57.90 |
| | rc2 | −110 | dc2 | 18.0 | | | aspheric coefficient ε = −0.5   f = 65.010 mm
r2/f = 0.604
r3/r2 = 0.560
r4/f = −0.930 diopter adjustment

| d2 (mm) | d4 (mm) | diopter |
|---|---|---|
| 0.4 | 4.0 | −3.27 |
| 4.0 | 0.4 | 0.84 |
| 2.4 | 2.0 | −1.00 |

TABLE 7

| | Lateral displacement (0.1 mm) | | | | Tilt (15') | | | | Error | |
|---|---|---|---|---|---|---|---|---|---|---|
| | DS (diopter) | | DT (diopter) | | DS (diopter) | | DT (diopter) | | DS | DT |
| | L$_1$ | L$_2$ | L$_1$ | L$_2$ | L$_1$ | L$_2$ | L$_1$ | L$_2$ | (diopter) | (diopter) |
| Conventional embodiment A | 0.046 | −0.049 | 0.116 | −0.117 | −0.042 | 0.042 | −0.115 | 0.104 | 0.090 | 0.226 |
| Conventional embodiment B | −0.014 | 0.021 | −0.049 | 0.078 | −0.018 | 0.027 | −0.092 | 0.113 | 0.041 | 0.172 |
| Conventional embodiment C | −0.066 | 0.070 | −0.273 | 0.302 | −0.045 | 0.066 | −0.224 | 0.295 | 0.125 | 0.550 |
| Conventional embodiment D | −0.063 | 0.066 | −0.267 | 0.287 | −0.045 | 0.065 | −0.224 | 0.290 | 0.121 | 0.537 |
| the fourth embodiment of the present invention | 0.018 | −0.015 | 0.022 | −0.008 | −0.026 | 0.032 | −0.065 | 0.069 | 0.047 | 0.098 |

What is claimed is:

1. A viewfinder lens system comprising from an object side to an eye side;
   a first lens element having a negative refractive power; and
   a second lens element having an optical axis and a positive refractive power with an air space formed between the first and second lens elements, wherein the second lens element has an aspheric surface at its object side whose radius of curvature increases in accordance with an increase in height from its optical axis; and
   the viewfinder lens system fulfills the following conditions;

$0.4 < R_2/f < 1.2$ $0.35 < R_3/R_2 < 0.8$ $-1.5 < R_4/f < -0.5$ $-0.8 < \epsilon < 0$ $25 < \nu_1 < 35$ $55 < \nu_2 < 65$ wherein:

$R_2$ represents a radius of curvature of an eye side surface in the first lens element;
$R_3$ represents a paraxial radius of curvature of an object side surface in the second lens element;
$R_4$ represents a radius of curvature of an eye side surface in the second lens element;
f represents a focal length of the whole lens sytem;
$\nu_1$ represents an Abbe number of the first lens element;
$\nu_2$ represents an Abbe number of the second lens element; and
ε represents an aspheric coefficient of the aspheric surface provided by $$X = (R_3 - \sqrt{R_3^2 - \epsilon Y^2})/\epsilon$$

wherein, X represents a distance, measured along a direction parallel with the optical axis, from a center of the aspheric surface to a point on the aspheric surface at a height, Y, from the optical axis.

2. A viewfinder lens system as claimed in claim 1, wherein said second lens element is made of a synthetic resin material.

3. A viewfinder lens system as claimed in claim 1, wherein said first lens element is made of a synthetic resin material.

4. A viewfinder lens system as claimed in claim 1, wherein said second lens element is shiftable along the optical axis relative to the first lens element for diopter adjustment.

5. A viewfinder lens system as claimed in claim 4, wherein said first lens element is shiftable along the optical axis for diopter adjustment.

6. A viewfinder lens system as claimed in claim 1, further comprising a third element located on the eye side of the second lens element with an air space formed between the second lens element and the third element.

7. A viewfinder lens system as claimed in claim 6, wherein the third element has a negative refractive power.

8. A viewfinder lens system as claimed in claim 6, wherein the third element has a positive refractive power.

9. A viewfinder lens system comprising from an object side to an eye side;
   a first lens element having a negative refractive power; and
   a second lens element having an optical axis and a positive refractive power with an air space formed between the first and second lens elements, wherein the second lens element has an aspheric surface at its object side; and the viewfinder lens system fulfills the following conditions:

$0.4 < R_2/f < 1.2$ $0.35 < R_3/R_2 < 0.8$ $-1.5 < R_4/f < -0.5$ $-0.8 < \epsilon < 0$ wherein:
$R_2$ represents a radius of curvature of an eye side surface in the first lens element;
$R_3$ represents a paraxial radius of curvature of an object side surface in the second lens element;
$R_4$ represents a radius of curvature of an eye side surface in the second lens element;
f represents a focal length of the whole lens system; and
represents an aspheric coefficient of the aspheric surface provided by $$X = (R_3 - \sqrt{R_3^2 - \epsilon Y^2})/\epsilon$$

wherein, X represents a distance, measured along a direction parallel with the optical axis, from a center of the aspheric surface to a point on the aspheric surface at a height, Y, from the optical axis.

10. A viewfinder lens system as claimed in claim 9, wherein the lens system further fulfills the following conditions:

$25 < \nu_1 < 35$ $55 < \nu_2 < 65$ wherein:
$\nu_1$ represents the Abbe number of the first lens element; and
$\nu_2$ represents the Abbe number of the second lens element.

11. A viewfinder lens system as claimed in claim 10, wherein the second lens element is shiftable along the optical axis relative to the first lens element for diopter adjustment.

12. A viewfinder lens system as claimed in claim 11, wherein the second lens element is made of a synthetic resin material.

13. A viewfinder lens system as claimed in claim 10, wherein the first lens element is shiftable along the optical axis relative to the first lens element for diopter adjustment.

14. A viewfinder lens system as claimed in claim 10, wherein both of the first and second lens elements are made of a glass material.

* * * * *